A. E. LAWRENCE.
VULCANIZER.
APPLICATION FILED APR. 17, 1914.

1,198,932.

Patented Sept. 19, 1916.
2 SHEETS—SHEET 1.

Inventor
A. E. Lawrence,

Witnesses

By Victor J. Evans
Attorney

A. E. LAWRENCE.
VULCANIZER.
APPLICATION FILED APR. 17, 1914.

1,198,932.

Patented Sept. 19, 1916.
2 SHEETS—SHEET 2.

Witnesses
Inventor
A. E. Lawrence,
By Victor J. Evans
Attorney

UNITED STATES PATENT OFFICE.

ARTHUR E. LAWRENCE, OF SAN MARCOS, TEXAS, ASSIGNOR OF ONE-HALF TO NORA HANKE, OF HAYS COUNTY, TEXAS.

VULCANIZER.

1,198,932.   Specification of Letters Patent.   Patented Sept. 19, 1916.

Application filed April 17, 1914. Serial No. 832,604.

*To all whom it may concern:*

Be it known that I, ARTHUR E. LAWRENCE, a citizen of the United States, residing at San Marcos, in the county of Hays and State of Texas, have invented new and useful Improvements in Vulcanizers, of which the following is a specification.

My invention relates to a vulcanizer especially designed for vulcanizing the casings or shoes of pneumatic tires, whereby repairs may be made in a ready, convenient and economical manner.

The primary object of the invention is to provide a vulcanizer which is simple, reliable and efficient in construction, capable of being easily applied to the casing which is to be repaired, and which provides for the uniform heating of the casing over the entire area to be vulcanized.

A further object of the invention is to provide a vulcanizer which is curved in cross section to correspond to the tire casing, and is chambered to hold a combustible fluid which is ignited to produce the required heat, and has its chambered surface so constructed as to maintain the fluid at the different points at the required level relative to different portions of the surfaces under treatment to prevent either over or under heating.

A still further object of the invention is to provide a vulcanizer by which patches for closing punctures or blow outs may be readily and conveniently applied, and surface cuts, bruises and other imperfections cured, to cover and protect the fabric of the casing.

The invention consists of the features of construction, combination and arrangement of parts herein fully described and claimed, reference being had to the accompanying drawings in which:—

Figure 1:
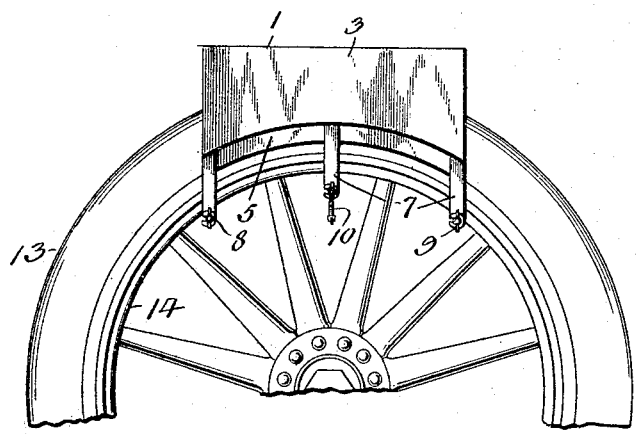
Figure 2:
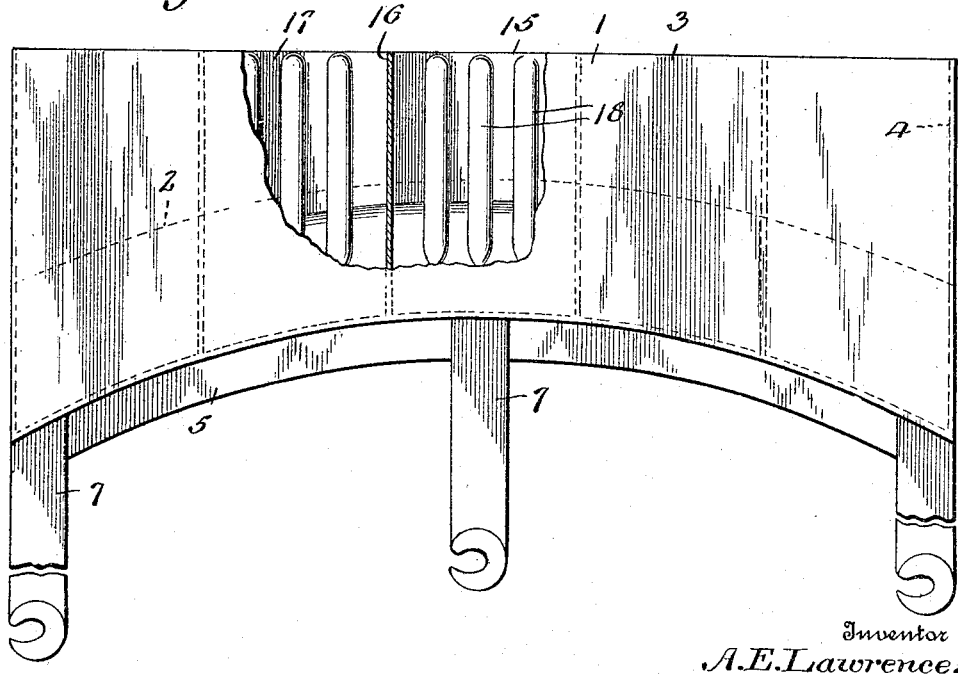
Figure 3:
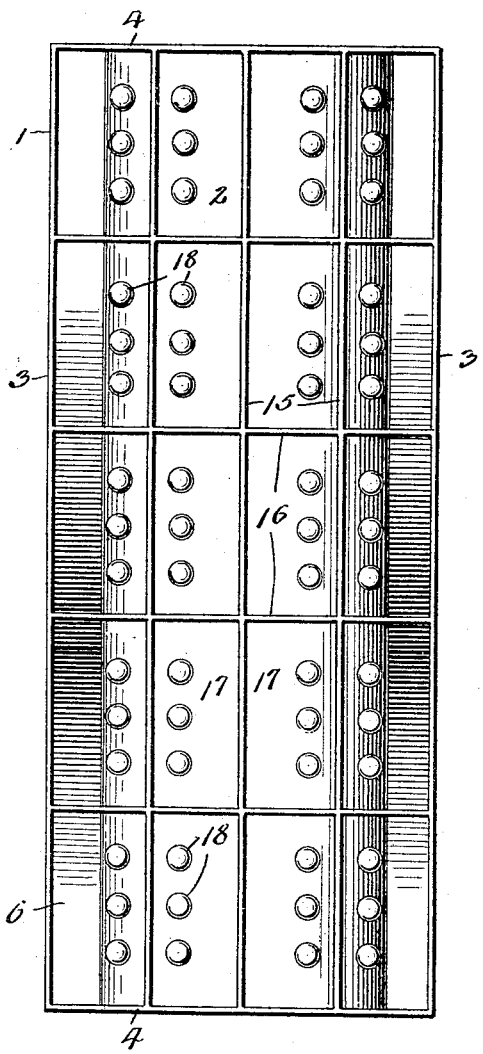
Figure 4:
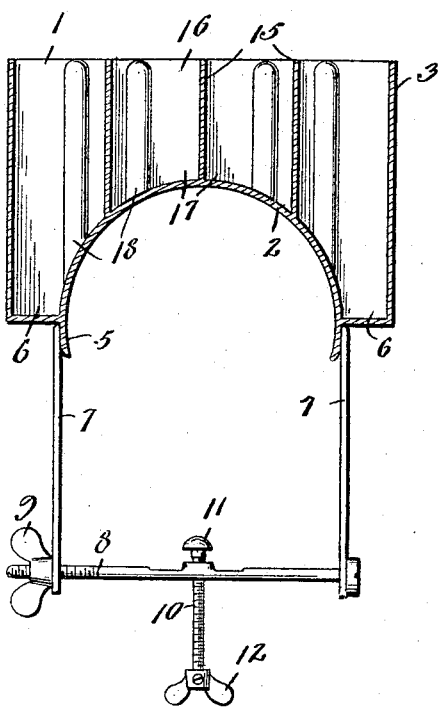

Figure 1 is a view showing the application of the invention to a wheel for use in vulcanizing a portion of the outer casing. Fig. 2 is a side elevation of the vulcanizer, parts being broken away to show interior construction. Fig. 3 is a top plan view of the same. Fig. 4 is a vertical transverse section through the vulcanizer.

Referring to the drawing, 1 designates the vulcanizer as a whole, which is generally of oblong rectangular form, and includes a bottom 2 and side and end walls 3 and 4 rising therefrom. The vulcanizer may be of any suitable length and width, and its bottom wall 2, which constitutes the vulcanizing surface, is longitudinally and transversely curved to inclose or straddle the tire. It will of course be understood that the radius of the bottom wall 2 will also conform to that of the particular portion or section of the tire which is to be covered, and that the vulcanizer may be made of different sizes to suit different sizes of tires.

The bottom wall 2 is provided with extensions 5 depending below the lower edges of the side walls 3, to insure the secure seating of the device in place, while the side walls 3, which are preferably straight and parallel, and provided with lower curved edges of the same radius as the bottom wall 2, are spaced a distance greater than the maximum width or diameter of the bottom wall and are provided at their lower edges with bottom portions or inward extensions 6 connecting the same with the depending sides of the bottom wall, so that the heat from the heating agent may be transmitted to the wall 2 throughout its intended vulcanizing area. For the purpose of securing the device upon a wheel during the vulcanizing process, bracket arms 7 are provided and depend from the extensions 5 in transversely alined pairs, said arms having hooked lower ends to receive cross bolts 8 which are provided with retaining nuts 9 and are centrally apertured for the reception of binding and centering screws 10, each having a cushioned head 11 to bear against the rim of the wheel and a retaining nut 12 to secure it in position. Fig. 1 shows the application of the invention, from which it will be seen that the device is arranged to straddle the tire casing 13, and that the cross bolts 8 extend beneath the rim 14 of the wheel and the bolts 10 bear against the rim to support the device in position, the mode of application and removal being obvious from the foregoing description.

The walls 3 and 4 of the vulcanizer bound the wall 2 and form a heating box or chamber to receive a combustible fluid, such as gasolene, which is intended to be ignited for the purpose of heating the bottom wall 2 for the vulcanizing action. For the purpose of increasing the efficiency of the heating agent, I provide the interior of the box or chamber with longitudinally and transversely extending partitions or webs 15 and 16, which are comparatively thin, and which subdivide the box or chamber into a plurality of longitudinal and transverse rows of pockets or cells 17, each designed to hold a proportion of the combustible fluid to a certain depth or elevation. It will be understood that the flames produced by the ignition of the combustible fluid heat the fluid and the wall 2, and these flames are designed to impinge against metallic pins or other equivalent heat conducting elements extending upwardly from the bottom wall 2 whereby the heat is better transmitted thereto, a group or desired number of such heat conducting elements being disposed within each pocket or cell.

The purpose of subdividing the box or chamber into compartments is two-fold, first to make the effective height or level of the combustible fluid substantially the same at all points, in order to effect a uniform heating of the vulcanizing plate 2, which could not otherwise be obtained, and second to enable a local portion of the tire to be treated without unduly heating adjacent portions which are not under treatment. In addition to these functions the thin division plates 15 further form conducting surfaces which act in conjunction with the conducting members 18 to transmit the heat to the plate and thereby render the heating of the plate uniform at all points in the use of all of the pockets or cells in the vulcanizing action.

In the process of vulcanizing a portion of the tire, a suitable quantity of the combustible fluid is placed in all or a desired number of the cells or pockets, and the surface of said fluid ignited. The fluid itself is thus heated to the vaporizing point, and thereby transmits heat to the plate 2, while the flames also impinge against and heat the surfaces 15, 16 and 18, whereby a uniform heating of the vulcanizing plate is obtained. The device is especially intended and will be found of maximum advantage in vulcanizing the tread surfaces of tire shoes or casings, for the purpose of sealing punctures or blow outs, or to enable cuts or abraded surfaces to be closed and covered to protect the fabric of the tire from the action of moisture, under which it is liable to rot and weaken the casing. By means of the device, the surface of the tire may also be kept smooth in a ready, convenient and inexpensive manner.

I claim:—

1. A tire vulcanizer of the character described comprising a receptacle including a bottom wall or plate which is longitudinally and transversely of concavo-convex form and of a width to embrace the tread and sides of the tire, walls rising from the marginal portions of the convex surface of the plate and forming a chamber for the reception of a combustible fluid of a width to extend across the tread and sides of the tire, and parallel rows of longitudinal and transverse division plates within said chamber and subdividing the same to provide longitudinal and transverse rows of cells of restricted size from side to side of said chamber.

2. A vulcanizer comprising a bottom wall or plate longitudinally and transversely of concavo-convex form, end walls rising from the convex surface of the plate, parallel side walls connected with the end walls to provide a box chamber for the reception of a combustible fluid, said side walls being spaced a distance greater than the width of the plate and having inwardly projecting horizontal extensions at their lower ends connected with the lower portions of the side walls of the plate, longitudinal and transverse partitions within the box or chamber subdividing the same to provide longitudinal and transverse rows of cells or pockets, and securing means connected with the depending portions of the sides of the plate.

3. A vulcanizer of the character described having a vulcanizing surface comprising a base plate of concavo-convex form longitudinally and transversely, bottom walls extending laterally from the sides of said plate, side walls rising from said bottom walls, end walls rising from the plate and side walls, said bottom, side and end walls forming a receptacle for a combustible fluid open at its side opposite the plate and bottom walls, a plurality of longitudinal partitions separating said receptacle into a plurality of central side cells, and transverse partitions sub-dividing said cells.

4. A vulcanizer of the character described comprising a base plate longitudinally and transversely of concavo-convex form, bottom walls projecting laterally from the sides of the base plate above the lower edges thereof, leaving short portions of the latter depending below said walls, side walls extending upwardly from said lateral walls beyond the sides of the base plate, end walls connecting said base plate, bottom and side walls forming therewith an oblong rectangular chamber, series of longitudinal and transverse compartments separating said chamber into rows of longitudinal and transverse cells, members depending from the said depending short portions of the side walls of the base plate and arranged so as to lie on opposite sides of a tire and wheel to which the device is applied, and connecting means extending transversely between said members and provided with means for securing the vulcanizer to the wheel.

5. A vulcanizing device comprising a vulcanizing plate, having a vulcanizing face adapted to lie in direct contact with a tire, said plate being longitudinally curved to extend circumferentially around a portion of the tire and being transversely curved to envelop the tread and sides of the tire adjacent to the rim points, and a chamber upon the opposite side of said plate of a width greater than said plate, said chamber being provided with longitudinal and transverse partitions forming cells or pockets longitudinally and transversely along the crown and side portions thereof, said cells or pockets being adapted to jointly or independently receive charges of a combustible fluid, whereby different portions or areas of the tread and sides of a tire may be separately or conjointly vulcanized.

In testimony whereof I affix my signature in presence of two witnesses.

ARTHUR E. LAWRENCE.

Witnesses:
B. G. NEIGHBOR,
T. J. SAUNDERS.

Copies of this patent may be obtained for five cents each, by addressing the "Commissioner of Patents, Washington, D. C."